US008693819B2

(12) United States Patent
Marom (10) Patent No.: US 8,693,819 B2
(45) Date of Patent: Apr. 8, 2014

(54) METHOD AND SYSTEM FOR SWITCHING OPTICAL CHANNELS (75) Inventor: Dan M. Marom, Tel Aviv (IL)

(73) Assignee: Yissum Research Development Company of the Hebrew University of Jerusalem, Ltd., Jerusalem ( * ) Notice: Subject to any disclaimer, the term of this patent is extended or adjusted under 35 U.S.C. 154(b) by 45 days.

(21) Appl. No.: 13/503,341

(22) PCT Filed: Oct. 21, 2010

(86) PCT No.: PCT/IL2010/000873
§ 371 (c)(1),
(2), (4) Date: Apr. 20, 2012

(87) PCT Pub. No.: WO2011/048599
PCT Pub. Date: Apr. 28, 2011

(65) Prior Publication Data
US 2012/0219252 A1 Aug. 30, 2012

Related U.S. Application Data (60) Provisional application No. 61/253,962, filed on Oct. 22, 2009.

(51) Int. Cl.
*G02B 6/26* (2006.01)
(52) U.S. Cl.
USPC ............................... 385/18; 385/16; 359/872
(58) Field of Classification Search
USPC ........................................ 385/16–18; 359/872
See application file for complete search history.

(56) References Cited

U.S. PATENT DOCUMENTS

| 6,097,859 A | 8/2000 | Solgaard et al. |
| 6,289,145 B1 | 9/2001 | Solgaard et al. |
| 6,327,398 B1 | 12/2001 | Solgaard et al. |
| 6,389,190 B2 * | 5/2002 | Solgaard et al. ................. 385/18 |
| 6,560,000 B2 * | 5/2003 | Iyer et al. ...................... 359/238 |
| 6,738,540 B2 | 5/2004 | Marom |

(Continued)

FOREIGN PATENT DOCUMENTS

| JP | 2006039425 A | 2/2006 |
| JP | 2006284740 A | 10/2006 |
| WO | 03019974 A1 | 3/2003 |
| WO | 2008118451 A1 | 10/2008 |

OTHER PUBLICATIONS

International search report for application No. PCT/IL2010/000873 dated Mar. 4, 2011.

(Continued)

*Primary Examiner* — Daniel Petkovsek
(74) *Attorney, Agent, or Firm* — Fenwick & West LLP (57) ABSTRACT An optical switching system is disclosed. The system comprises: input optics, for receiving light from at least one input optical port and separating the light into a plurality of optical channels to assign a separate optical path to each channel of each input optical port. The system further comprises an input steering array and an output steering array arranged such that the input steering array is imaged onto the output steering array, wherein the input steering array is configured to receive the separated light and steer each optical channel to an individual element of the output steering array. The system further comprises output optics, for receiving the optical channels from the output steering array and coupling the optical channels into at least one output optical port.

22 Claims, 9 Drawing Sheets

(56) References Cited

U.S. PATENT DOCUMENTS

| | | |
|---|---|---|
| 6,867,920 B2 | 3/2005 | Marom |
| 6,984,917 B2 | 1/2006 | Greywall et al. |
| 7,016,098 B2 | 3/2006 | Giles et al. |
| 7,072,539 B2 * | 7/2006 | Wu et al. .......................... 385/18 |
| 7,088,882 B2 * | 8/2006 | Ducellier et al. ............... 385/17 |
| 7,126,250 B2 | 10/2006 | Greywall et al. |
| 7,231,106 B2 | 6/2007 | Basavanhally et al. |
| 7,254,293 B1 | 8/2007 | Helkey et al. |
| 7,257,288 B1 * | 8/2007 | Strasser et al. .................. 385/24 |
| 7,272,278 B2 * | 9/2007 | Takushima et al. ............. 385/24 |
| 7,283,709 B2 | 10/2007 | Doerr et al. |
| 7,333,688 B2 | 2/2008 | Doerr et al. |
| 7,376,311 B2 | 5/2008 | Doerr et al. |
| 7,403,322 B2 | 7/2008 | Greywall et al. |
| 7,649,670 B2 | 1/2010 | Basavanhally et al. |
| 8,045,854 B2 * | 10/2011 | Colbourne ...................... 398/48 |
| 2002/0076146 A1 | 6/2002 | Iyer et al. |
| 2003/0174935 A1 * | 9/2003 | Miller et al. .................... 385/24 |
| 2005/0074204 A1 * | 4/2005 | Wilson et al. ................... 385/24 |

OTHER PUBLICATIONS

Marom, et al., "Wavelength-Selective 1 × K Switches Using Free-Space Optics and MEMS Micromirrors: Theory, Design, and Implementation," Journal of Lightwave Technology, IEEE, Apr. 1, 2005, pp. 1620-1630, vol. 23, No. 4, New York, NY.

Patent Cooperation Treaty, Written Opinion of the International Searching Authority, International Patent Application No. PCT/IL2010/000873, mailed Mar. 4, 2011, 3 pages.

\* cited by examiner

FIG. 7

METHOD AND SYSTEM FOR SWITCHING OPTICAL CHANNELS

RELATED APPLICATION

This application claims the benefit of priority from U.S. Patent Application No. 61/253,962, filed on Oct. 22, 2009 the contents of which are hereby incorporated by reference as if fully set forth herein.

FIELD AND BACKGROUND OF THE INVENTION

The present invention, in some embodiments thereof, relates to optical switching and, more particularly, but not exclusively, to switching of optical channels among multiple input and output fibers.

Optical telecommunication employs optical systems for switching, filtering, multiplexing and demultiplexing of optical signals. For example, in wavelength division multiplexing (WDM) telecommunication, multiple optical channels, each having a unique range of wavelengths, carry modulated optical signals in a single optical fiber between a transmitter and a receiver, thereby increasing the transmission capacity of the communication. The transmitter uses an optical multiplexer to combine multiple channels into the fiber for transmission, and the receiver uses an optical demultiplexer to separate the optical channels for detection.

When WDM channels have to be routed at network nodes from one transport fiber to another, it is advantageous to do this routing in an all-optical fashion, i.e., without detecting the signal and retransmitting it. A routing functionality at network nodes is performed by a system called an optical cross-connect system.

One type of optical cross-connect system employs a single large port-count cross-connect that is not wavelength-selective, a demultiplexer and a multiplexer. In operation, the demultiplexer separates the WDM channels, the cross-connect performs the routing and the multiplexer which recombines the WDM channels at their respective rout thereafter.

Another type of optical cross-connect system employs a few wavelength-selective switches (WSS), which either distribute wavelengths from one fiber to multiple output fibers, or combine wavelengths from multiple fibers to a single output fiber. WSS are typically based on switching finite bandwidths of dispersed light, typically with micro-electro-mechanical system (MEMS) micromirrors or with liquid-crystals (LC) Spatial Light Modulators. Such configurations have the advantage that their passbands are typically broader than the solution employing discrete multiplexer and demultiplexer pair, which imply that the WDM channel experiences less filtering effects, thereby reducing cumulative degradation of the signals.

Systems of WSS are known in the art. Typically, such systems employ a combination of a grating and a lens for spatially dispersing or combining the input light, and an array of beam steering elements which performs the switching operation. The spectral characteristics of such systems are generally satisfactory because they switch continuous spectral bands belonging to individual channels [D. M. Marom, et al, 2005, "Wavelength-Selective 1×K Switches using Free-Space. Optics and MEMS Micromirrors: Theory, Design, and Implementation," IEEE J. Lightwave Technol., Vol. 23, No. 4, pp. 1620-30].

Additional background art includes U.S. Pat. Nos. 7,649,670, 7,333,688, 7,376,311, 7,283,709, 7,231,106, 7,126,250, 7,016,098, 6,984,917, 6,867,920, 6,738,540, 6,097,859, 6,289,145 and 6,327,398.

SUMMARY OF THE INVENTION

According to some embodiments of the invention the present invention there is provided an optical switching system. The system comprises: input optics, for receiving light from at least one input optical port and separating the light into a plurality of optical channels to assign a separate optical path to each channel of each input optical port. The system further comprises an input steering array and an output steering array arranged such that the input steering array is imaged onto the output steering array. The input steering array is configured to receive the separated light and steer each optical channel to an individual element of the output steering array. The system further comprises output optics, for receiving the optical channels from the output steering array and coupling the optical channels into at least one output optical port.

According to some embodiments of the invention the present invention there is provided an optical switching system. The system comprises: input optics, for receiving light from at least one input optical port and separating the light into a plurality of optical channels to assign a separate optical path to each channel of each input optical port; and output optics, for combining optical paths into at least one output optical port. The system also comprises an optical path steering arrangement for dynamically steering any optical path into any optical output port. The optical path steering arrangement has an input steering array and an output steering array, arranged such that the input steering array is imaged onto the output steering array. The input steering array is configured to receive light via the optical paths and steer each optical channel to an individual element of the output steering array.

According to some embodiments of the invention the at least one input optical port comprises a plurality of input optical ports.

According to some embodiments of the invention the at least one output optical port comprises a plurality of output optical ports.

According to some embodiments of the invention the input steering array and the output steering array engage the same plane.

According to some embodiments of the invention the optical path steering arrangement comprises a redirector array configured for providing spatial shifts subsequently to the steering by the input steering array.

According to some embodiments of the invention the redirector array comprises a plurality of redirector elements, each configured for redirecting a light beam impinging thereon by a predetermined redirection angle which is different from any redirection angle corresponding to any other redirector element of the redirector array.

According to some embodiments of the invention the redirector array is a reflective redirector array.

According to some embodiments of the invention the redirector array is a refractive redirector array.

According to some embodiments of the invention the input optics comprises an input diffractive optical element for separating the light according to wavelength and an input optical tilter array for separating the light according to the at least one input optical port.

According to some embodiments of the invention the output optics comprises an output optical tilter array for tilting the steered light so as to align light beams according to the at least one output optical port, and an output diffractive optical element for coupling optical channels according to the alignment.

According to some embodiments of the invention the input optics comprise an anamorphic prism optics constituted for expanding the input light along a first direction.

According to some embodiments of the invention the output optics comprise an anamorphic prism optics for contacting the coupled optical channel along the first direction.

According to some embodiments of the invention the system further comprises a controller configured for controlling the input steering array according to a predetermined imaging scenario between the input steering array and output steering array.

According to some embodiments of the invention the controller is configured for detuning at least one of the input steering array and the output steering array.

According to an aspect of some embodiments of the present invention there is provided an optical communication system, comprising at least one input waveguide, for propagating incoming wavelength division multiplexed light, at least one output waveguide for propagating outgoing wavelength division multiplexed light and a wavelength-selective cross-connect (WSXC) system. The WSXC system comprises at least some components and technical features of the optical switching system as delineated above and further exemplified hereinunder.

According to an aspect of some embodiments of the present invention there is provided a method of optical switching, comprising: directing light constituting a plurality of optical channels into at least one input optical port an optical switching system having a controller, operating the controller according to a predetermined imaging scenario, and receiving light from the at least one output optical port. The optical switching system comprises at least some components and technical features of the optical switching system as delineated above and further exemplified hereinunder According to an aspect of some embodiments of the present invention there is provided a method of optical switching. The method comprises: receiving light constituting N optical channels in each of K input optical ports and separating the light according to the optical channels along a first direction and according to the input optical ports along a second direction. The method further comprises focusing the separated light onto a plurality of focal spots defining a first array and imaging each focal spot onto an image focal spot to define a second array. In various exemplary embodiments of the invention an order along the second direction is different among the second array and the first array. The method further comprises steering light beams away from the second array to couple the beams into K output optical ports, wherein all beams corresponding to image focal spots having the same location along the second direction are coupled to the same output optical port.

According to some embodiments of the invention the first array and the second array engage the same plane.

According to some embodiments of the invention the separating according to the optical channels is effected by diffraction, and the separating according to the input optical port is effected by refraction.

According to some embodiments of the invention the beams are coupled by tilting each beam along the second direction according to a respective output optical port, and diffracting the tilted beams along the first direction.

According to some embodiments of the invention the method further comprises, prior to the separation, expanding the received light along the first direction.

According to some embodiments of the invention the coupling comprises contracting the beams along the first direction.

According to some embodiments of the invention the method further comprises, employing at least one detuning procedure for generally equalizing power levels of all channels for a given output optical port.

According to some embodiments of the invention the focusing comprises, providing spatial shifts to each individual light beam.

According to some embodiments of the invention the spatial shifts are provided by a redirector array which comprises a plurality of redirector elements, each configured for redirecting a light beam impinging thereon by a predetermined redirection angle which is different from any redirection angle corresponding to any other redirector element of the redirector array.

According to some embodiments of the invention the spatial shifts are provided by reflections.

According to some embodiments of the invention the spatial shifts are provided by refractions.

According to some embodiments of the invention the present invention there is provided an optical switching system. The system comprises: input imaging optics, for receiving light from at least one input optical port and imaging the light onto first dispersed plane, to separate received light according to wavelength channels of each input optical port; and output imaging optics, for receiving light from a second dispersed plane, where the second dispersed plane has light separated according to wavelength channels, and imaging the light onto at least one output optical port. The system further comprises an optical path steering arrangement for dynamically steering dispersed light from the first dispersed plane to the second dispersed plane. The optical path steering arrangement has an input steering array and an output steering array arranged such that input steering array is imaged onto the output steering array optionally and preferably with an intermediate redirector plane assigning deterministic shifts in the imaging. The input optical ports are imaged onto a first dispersed plane with input imaging optics, the optical path steering arrangement images first dispersed plane onto the second dispersed plane in a dynamic fashion, and the second dispersed plane is imaged onto output ports with output imaging optics, for switching wavelength channels from any input optical port to any output optical port.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS
OF THE INVENTION

The present invention, in some embodiments thereof, relates to optical switching and, more particularly, but not exclusively, to switching of optical channels among multiple input and output fibers.

Figure 1:
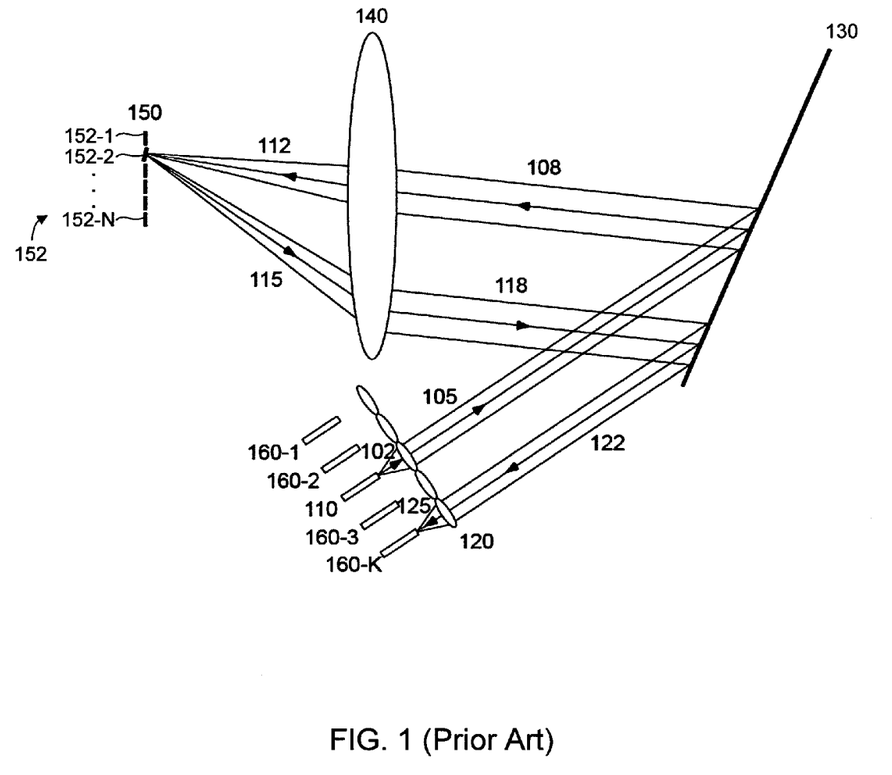
FIG. 1 is a schematic illustration of a conventional system of wavelength-selective switches.
Figure 2:
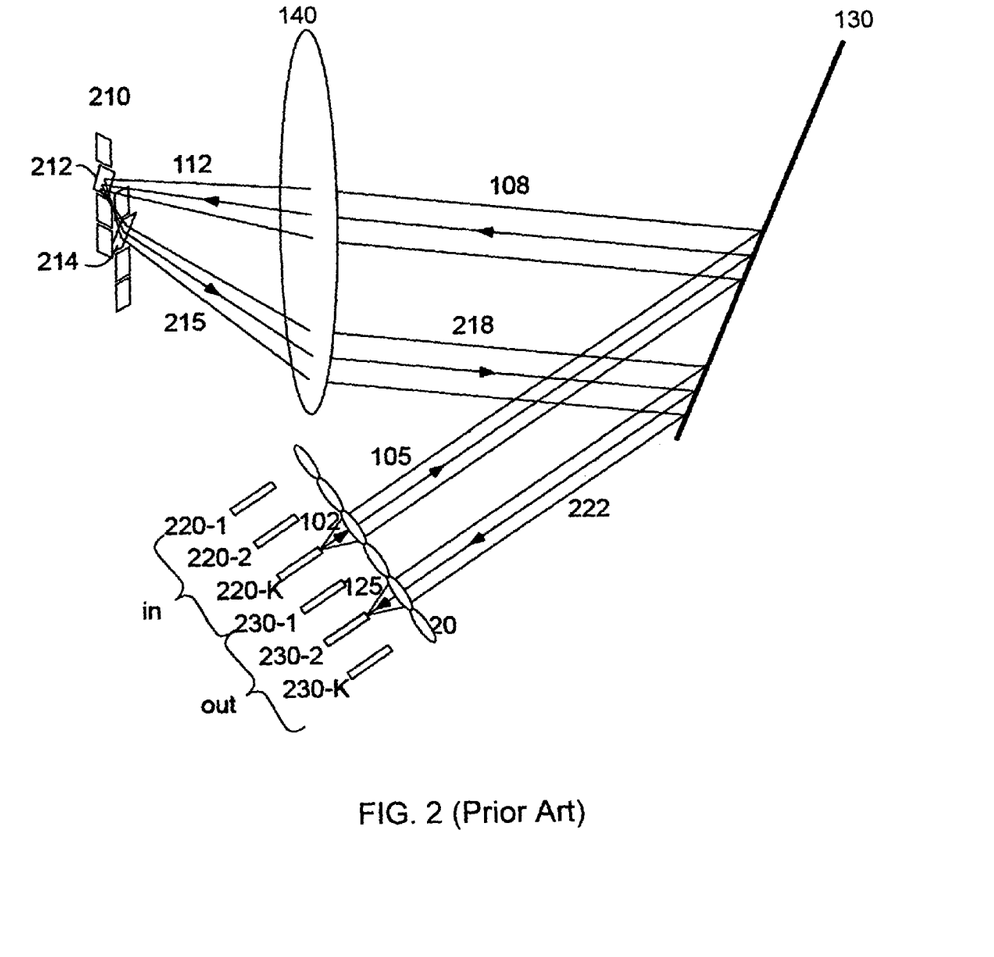
FIG. 2 is a schematic illustration of a conventional wavelength-selective cross-connect.

For purposes of better understanding some embodiments of the present invention, as illustrated in FIGS. 3-7 of the drawings, reference is first made to the construction and operation of conventional optical switching systems as illustrated in FIGS. 1 and 2.

FIG. 1 is a schematic illustration of a typical system 100 of WSS. Light from an input fiber 110 is spatially dispersed by a grating 130 and lens 140 combination. Channels from the dispersed light are independently beam steered by individual beam steering element enumerated 152-1 through 152-N, in a switching array 150. For each WDM channel, there is a separate steering element 152 (FIG. 1 shows a single channel switched by beam steering element 152-2). The steered light, which consists of the bandwidth captured by the respective beam steering element, is then back propagated through lens 140 and grating 130 to one of the output fibers 160-1 through 160-K. The tilt imposed by beam steering element 152-x of array 150 determines the output fiber. The channel passband characteristic is determined by the resolving power of the optical arrangement (lens 140 and grating 130), and is maximized when switching array 150 is placed at the lens back focal plane, where the spectral spots are focused. This means that both the input and output fibers are imaged onto beam steering array 150, ensuring that bandwidth captured by each beam steering element 152-x is switched from the input fiber 110 to the selected output fiber 160. The WSS shown in FIG. 1 thus distribute WDM channels from a single fiber 110 to a plurality of fibers 160. Also known are systems of WSS operated in reverse, combining WDM channels from a plurality of input fibers to a single output fiber. The optics in such systems is revered relative to the optics shown in FIG. 1, but the principle of operation is similar.

Attempts have also been made to devise systems that receive optical input from several fibers, and route the individual WDM channels from each fiber to several output fibers. Such systems are referred to as wavelength-selective cross-connect (WSXC).

FIG. 2 is a schematic illustration of a conventional WSXC 200. WSXC 200 employ the basic WSS architecture described above, and additionally have the light from each fiber (both input and output) incident on its own row of beam steering elements. Shown in FIG. 2 are several input fibers, designated 220-1 through 220-K, and several output fibers, designated 230-1 through 230-K. Input fibers 220 carry N optical channels to be routed to the output fibers 230. WSXC 200 includes a beam steering elements 210 which contains 2K rows of beam steering elements, each row having N elements. An optical path is established by two beam steering elements. The steering element receives a beam with particular wavelength from a particular input fiber, and steers that particular beam towards the corresponding beam steering element of the same wavelength of output fiber. The second beam steering element realigns the beam such that it is efficiently coupled to the output fiber.

It is recognized by the present inventor that this solution has a drawback in that the two beam steering elements cannot be simultaneously placed at the lens back focal plane where the spectral spots are focused. Thus, clipping by the beam steering elements' edges becomes pronounced and the channel passband characteristics are deteriorated.

The present inventor discovered an optical switching technique which is devoid of the above limitations.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 3A:
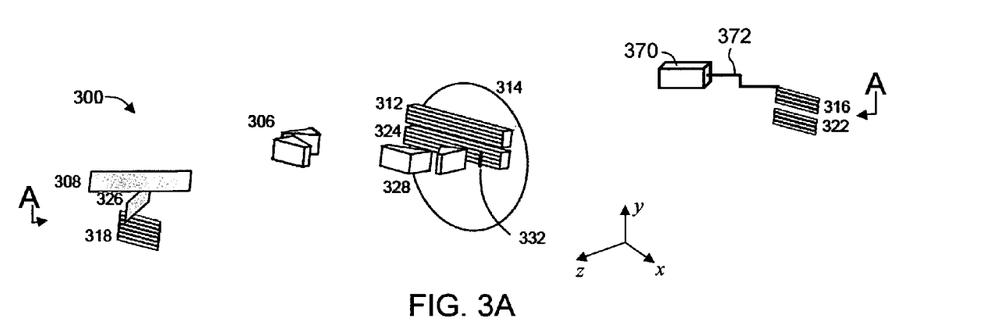
FIGS. 3A-F are schematic illustrations of a wavelength-selective optical cross-connect system, according to various embodiments of the present invention.
Figure 3B:
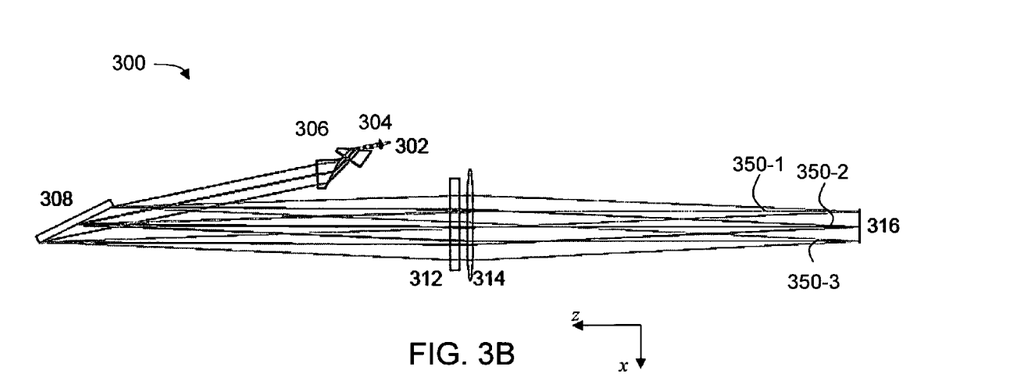
Figure 3C:
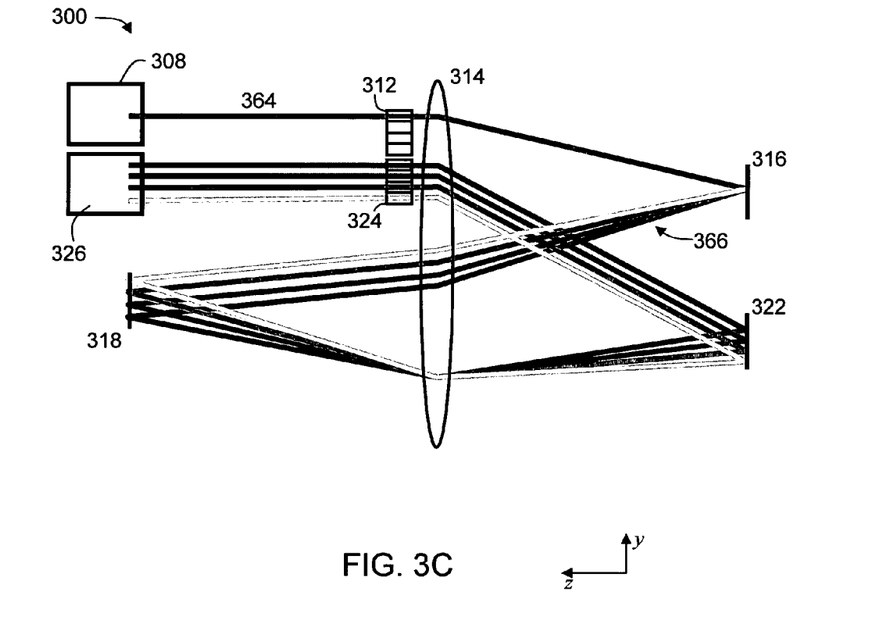
Figure 3D:
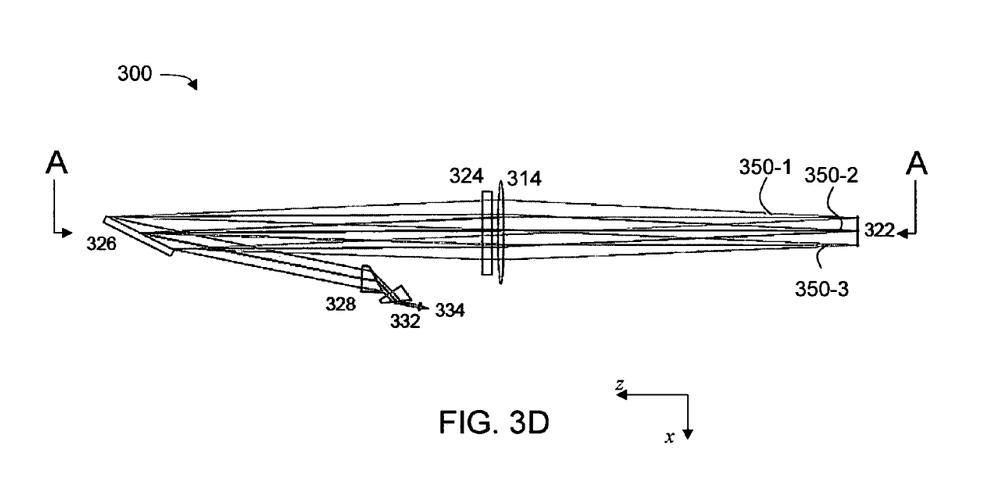
Figure 3E:
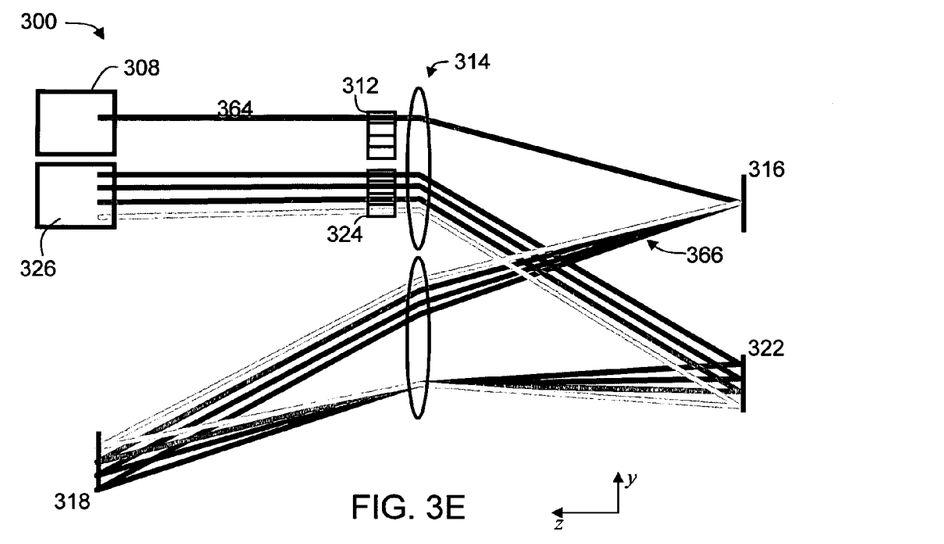
Figure 3F:
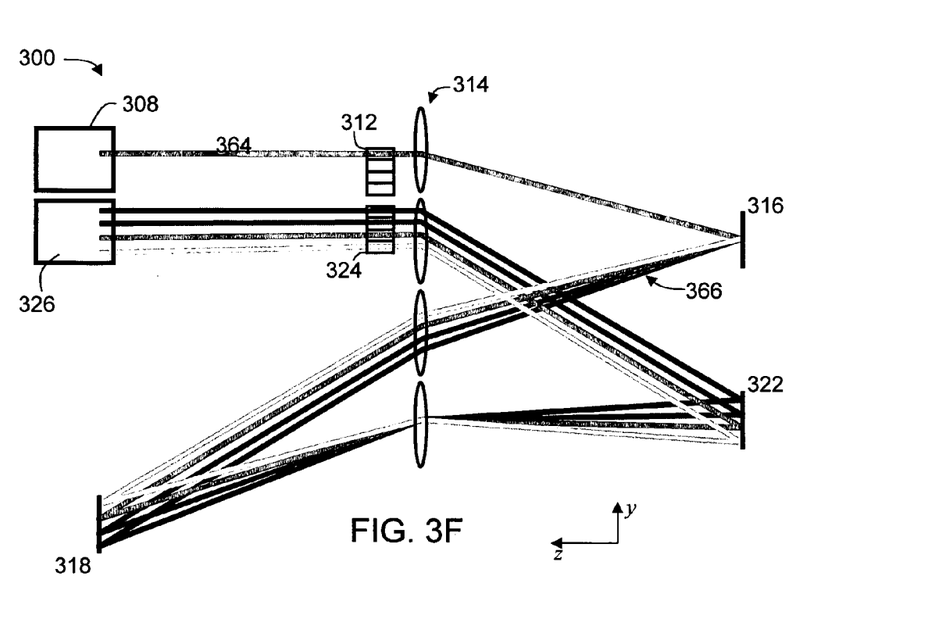

FIGS. 3A-F are schematic illustrations of an optical switching system 300, according to various exemplary embodiments of the present invention. FIG. 3A is a perspective view system 300 without showing the beam traces of the preferred embodiment, FIG. 3B is a top view illustrating the beam traces from input fiber to a spatially dispersed plane, FIGS. 3C, 3E and 3F are side views illustrating several optional embodiments for facilitating optical switching between input and output ports with FIG. 3C being the preferred embodiment, and FIG. 3D is a secondary top view illustrating the beam traces from a secondary spatially dispersed plane to the output fibers. Also shown in FIGS. 3A-F is a three-dimensional Cartesian coordinate system x-y-z, conveniently selected such that the x-z plane is parallel to FIGS. 3B and 3D and the y-z plane is parallel to FIGS. 3C, 3E and 3F. For example, the y-z plane can be a vertical plane and the x-z plane can be a horizontal plane. It is to be understood, however, that system 300 is operative in any orientation with respect to the gravity, and the terms "vertical" and "horizontal" are not to be construed as limiting.

System 300 can serve as a WSXC, which receives N optical channels on each of its $K_i$ input ports, and routes the individual optical channels from each input port to one of $K_o$ output ports, where each of $K_i$, $K_o$ and N is an integer number, preferably, but not necessarily, larger than 1. Thus, for example, when $K_i=K_o=K$, the WSXC of the present embodiments has K! switching permutations per channel. Typical values for $K_i$ and $K_o$ include, without limitation, any integer number from 2 to N, and typical values for N include, without limitation, any integer number from 10 to 200. It is expected that during the life of a patent maturing from this application wavelength division multiplexing technology will allow use of many more channels per optical waveguide and the scope of the invention is intended to include all such advances in the technology a priori. Thus, In some embodiments of the present invention N is even larger than 200.

In the representative example illustrated in FIGS. 3B-F the number of optical channels shown is 3. These channels are referred to herein collectively as channels 350 and individually as channels 350-1, 350-2 and 350-3. It is to be understood that any other number of channels is not excluded from the scope of the present invention. The input ports are typically stacked along the y direction. For clarity of presentation the input ports are only shown collectively at 302 (see FIG. 3B). Similarly, the output ports are typically stacked along the y direction, and are only shown collectively at 334 (see FIG. 3D).

System 300 comprises input optics which receive light from one or more input optical ports 302 and separates the light into a plurality of optical channels 350 to assign a separate optical path to each channel of each input optical port. Broadly speaking, the input optics separates the light according to optical channels 350 along the x direction and according to input optical ports 302 along the y direction, thus forms $K_i \times N$ separate optical paths. The separation according to the optical channel is typically effected by diffraction, but can be achieved by means of refraction as well. Separating according to the input optical port is typically effected by refraction or reflection. In principle, any optical arrangement that separates the light to $K_i \times N$ separate optical paths, wherein the separation according to input port is along one direction and the separation according to channel is along another direction is suitable for at least some embodiments of the present invention.

In the representative illustration of FIGS. 3A-D the input optics comprises an input diffractive optical element 308 which separate the light according to the wavelength or optical channel, and an input optical tilter array 312 which separates the light according to the input optical port.

Element 308 can be for example, a diffraction grating. Element 308 can operate in transmission mode, in which case the light experiences diffraction by passing through element 308, or, as illustrated in FIG. 3B, in reflective mode in which case the light experiences diffraction while being reflected off element 308. Also contemplated, are embodiments in which the separation according to optical channels is performed by other dispersive elements, including, without limitation, a prism which is known to deflect different wavelengths of light at different angles. Further contemplated is a combination of grating and prism or any other optical element, such as, but not limited to, such as a volume hologram, capable of deflecting the light at wavelength-dependent angles.

Input optical tilter array 312 is an arrangement of optical tilter elements along the y direction, wherein each tilter element in the array applies a slightly different tilt to a beam incident thereon. The tilt applied by the individual tilter elements is preferably fixed and corresponds to the respective input port. Thus, tilter array 312 preferably includes $K_i$ tilter elements each being aligned with a respective input port. In these embodiments, tilter array 312 provides $K_i$ different tilt angles along the y direction (one unique tilt angle per input port). The tilter elements can be of any type known in the art and they can operate either in reflective mode in which case the respective beam is tilted while being reflected off the respective tilter element, or, as illustrated in FIGS. 3B-C, in transmission mode, in which case the respective beam is tilted by passing through the respective tilter element. Representative examples of tilter elements include micro-prisms, micro-mirrors, diffractive elements and the like.

In some embodiments, the input optics also comprises an anamorphic optics 306, positioned in the optical path of the input light before the diffractive optical element 308. Anamorphic optics can be, for example, an anamorphic prism optics. An anamorphic prism is a device which allows for the magnification of a beam size along one axis while leaving the beam unchanged along another other axis. Alternatively, anamorphic optics 306 can be embodied as a cylindrical lens pair. As shown in FIG. 3B, optics 306 provides a one-dimensional expansion of the input light in the x-z plane. Such expansion facilitates better separation between different optical channels along the x direction, thus enhancing the spectral resolving power as the number of grating periods being illuminated is larger. Optionally, the input optics also comprises $K_i$ input collimator lens systems 304, one collimator lens system for each input port. Each lens system 304 is preferably positioned at or in proximity to the respective input port for collimating the input light prior to the diffraction and tilting and optional expansion. Thus, reference sign 304 corresponds to a stack or array of lens systems arranged along the y direction.

In various exemplary embodiments of the invention system 300 comprises an input steering array 316 and an output steering array 322 arranged such that array 316 is imaged onto array 322.

As used herein, a first object is said to be "imaged" onto a second object if the two objects are positioned such that a light beam passing from one object to the other object is focused both on the first object and on the second object.

Imaging of one object onto another is typically established by a focusing optical element such as a lens or a lens system. In the representative illustration of FIGS. 3C, 3E and 3F each of input steering array 316 and output steering array 322 engages the focal plane of a lens system 314, which can be a single lens or an arrangement of lenses. FIG. 3C illustrates an embodiment in which lens system 314 is a single lens, FIG. 3E illustrates an embodiment in which lens system 314 comprises two lenses, and FIG. 3F illustrates an embodiment in which lens system 314 comprises four lenses. Other configurations for lens system 314 are not excluded from the scope of the present invention, provided that array 316 is imaged by lens system 314 onto array 322. In various exemplary embodiments of the invention the length of the optical path between arrays 316 and 322 is 4f where f is the focal length of lens system 314. These 4f embodiments are further detailed hereinunder. Other optical path lengths between arrays 316 and 322 (e.g., 6f, 8f, etc.) are not excluded from the scope of the present invention.

Figure 4:
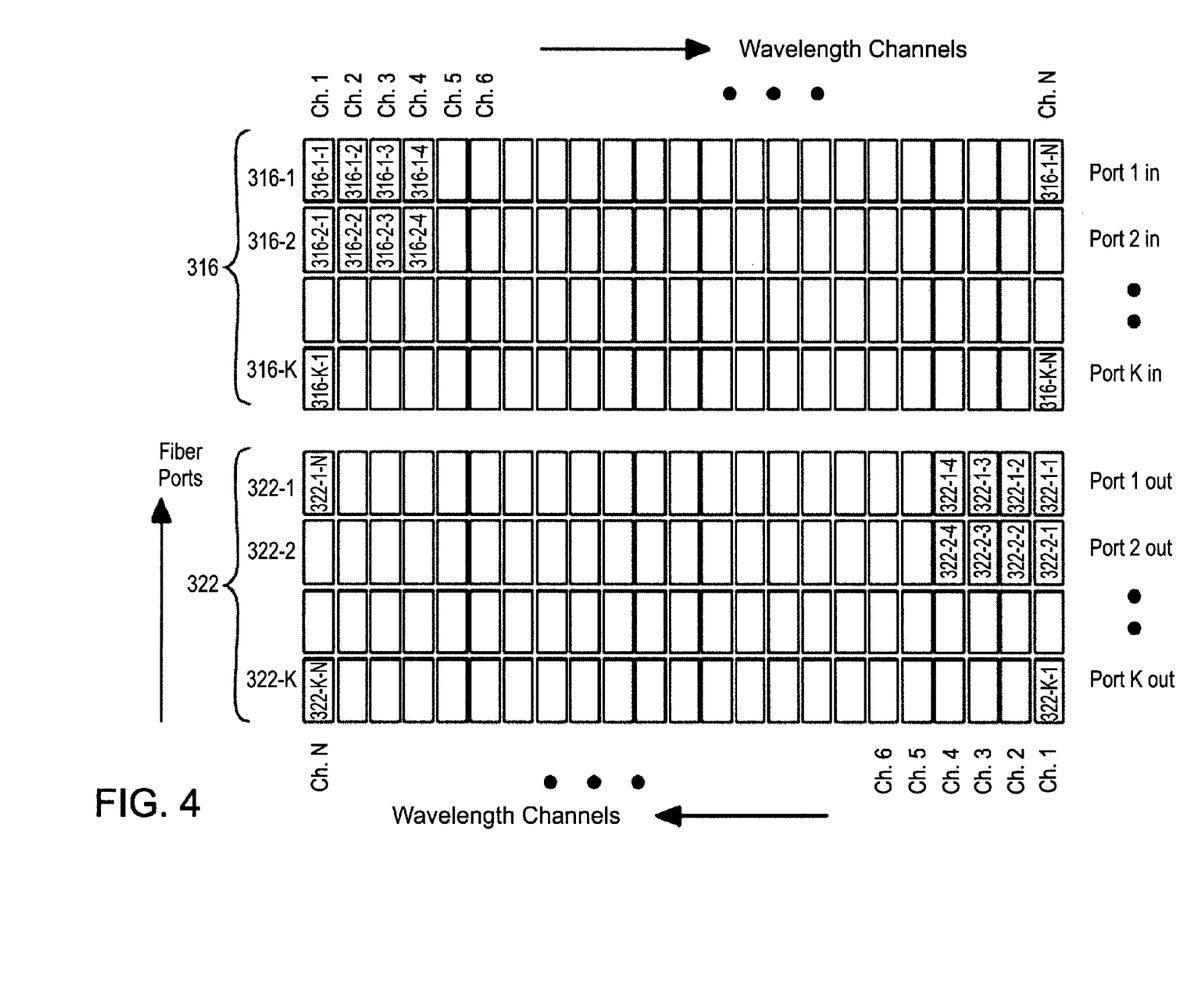
FIG. 4 is a schematic illustration of exemplary layouts of steering arrays according to some embodiments of the present invention.

Each of arrays 322 and 316 is a two-dimensional array of individual beam steering elements, arranged along the x and y direction. Representative examples of possible layouts for arrays 322 and 316 are illustrated in FIG. 4. Each of arrays 316 and 322 is further divided to rows along the x direction and columns along the y direction, where the number of rows of array 316 equals the number of rows of array 322 equals $K_o$, and the number of columns in both array 316 and 322 equals N. The rows of array 316 are labeled 316-1 through 316-$K_i$, the rows of array 322 are labeled 322-1 through 322-$K_o$, and the columns are labeled by the channel number Ch. 1 through Ch. N. Each individual beam steering element is identified by a three-number reference numeral according to the format Array-Row-Column. The beam steering elements can be reflective or refractive. The beam steering elements can be implemented by tilting micromirrors, e.g., micromirrors fabricated using MEMS technology, by linear phase gradients written into liquid crystal (LC), spatial light modulators (SLM), and the like. Beam steering elements suitable for the present embodiments are found, for example, in U.S. Pat. Nos. 7,403,322, 6,867,920 and 7,333,688, the contents of which are hereby incorporated by reference.

In operation, the light, after being separated by the input optics (e.g., by means of diffractive optical element 308 and tilter array 312) is focused by lens system 314 onto a plurality of focal spots on array 316, each focal spots engages a different steering element of array 316. Array 316 steers the individual light beams, preferably dynamically for an active switch functionality, such that each focal spot is imaged onto an image focal spot on array 322, wherein each image focal spot engages a different steering element of array 322. The imaging is optionally and preferably such that the order of the spots along the y direction at array 316 is different from the order of the image spots along the y direction at array 322. For example, array 316 can steer a light beam from element 316-1-1 (namely an element of array 316 at the first row and the first column) to element 322-2-1 (namely an element of array 322 at the second row and the first column). Such steering, as will be explained below, results in routing the first channel of the first input port to the second output port. In various exemplary embodiments of the invention the spatial shifts for switching are achieved by a redirector array 318. These embodiments are described hereinunder.

Array 316 steers the light beams "dynamically" in the sense that the steering angle prescribed by a particular steering element of array 316 to a particular optical beam is controllable, e.g., by means of a controller 370. For example, when array 316 is a MEMS wherein each steering element is a rotatable micromirror, controller 370 can transmits control signals to the MEMS, e.g., via communication line 372, and the MEMS can rotate the micromirrors responsively to the control signals. Similarly, when array 316 comprises linear phase gradients written into LC SLM, controller 370 can transmits control signals so as to vary the phase pattern on the LC. All these operations are well-known to those skilled in the art of optics.

Array 322 dynamically steers the beam away from array 322 in the direction of output optics described below. The principles of operations of array 322 are similar to the principles of operations of array 316.

The output optics receive the steered optical channels and couples them into output optical port(s) 334. The output optics can be similar to the input optics described above except that the optical function is reversed. For example, the output optics can comprise an output optical tilter array 324 which tilts the steered beams so as to align the beams according to the output optical port(s), and an output diffractive optical element 326 which couples the optical channels according to the alignment. In other words, the output optics (e.g., tilter array 324 and element 326) ensure that all beams corresponding to image focal spots having the same location along the y direction are coupled to the same output optical port.

Output optical tilter array 324 is an arrangement of optical tilter elements along the y direction, wherein each tilter element in the array applies a slightly different tilt to a beam incident thereon. Tilter array 324 preferably includes $K_o$ tilter elements each providing a tilt corresponding to a respective output port. In these embodiments, tilter array 324 provides $K_o$ different tilt angels along the y direction (one unique tilt angle per output port). The tilter elements can be of any type known in the art and they can operate either in reflective mode in which case the respective beam is tilted while being reflected off the respective tilter element, or, as illustrated in FIGS. 3B-C, in transmission mode, in which case the respective beam is tilted by passing through the respective tilter element. Representative examples of tilter elements include micro-prisms, micro-mirrors and the like.

In various exemplary embodiments of the invention output diffraction optical element 326 is the same as input diffractive optical element 308, except that it is flipped along the x direction. These embodiments allow utilization of separate locations for the input ports 304 and output ports 334.

In some embodiments, the output optics also comprises an anamorphic optics 328, positioned in the light path of the steered beam after diffractive optical element 326. Anamorphic optics 328 can be, for example, an anamorphic prism pair or a pair of cylindrical lenses. As shown in FIG. 3D, optics 328 provides a one-dimensional contraction of the steered light in the x-z plane. Such contraction facilitates the in-coupling of the beam into the respective output port. Optionally and preferably, the one-dimensional contraction provided by anamorphic prism optics 326 matches the one-dimensional expansion provided by anamorphic prism optics 306.

Optionally, the output optics also comprises $K_o$ input collimator lens systems 332, one lens system for each output port. Each lens system is preferably positioned at or in proximity to the respective output port for focusing the input light into the output port. Thus, reference sign 332 corresponds to a stack or array of lens systems arranged along the y direction.

Figures 6A, 6B:
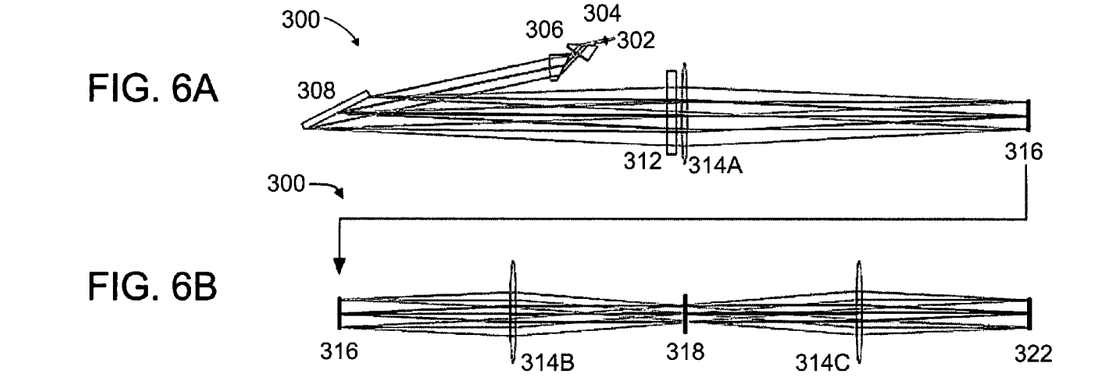
FIGS. 6A-D are, in serial continuation, a schematic illustration of a wavelength-selective optical cross-connect system, in embodiments of the invention in which the system comprises refractive steering array.
Figure 6C:
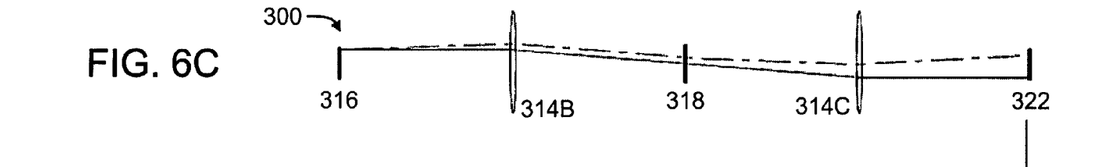
Figure 6D:
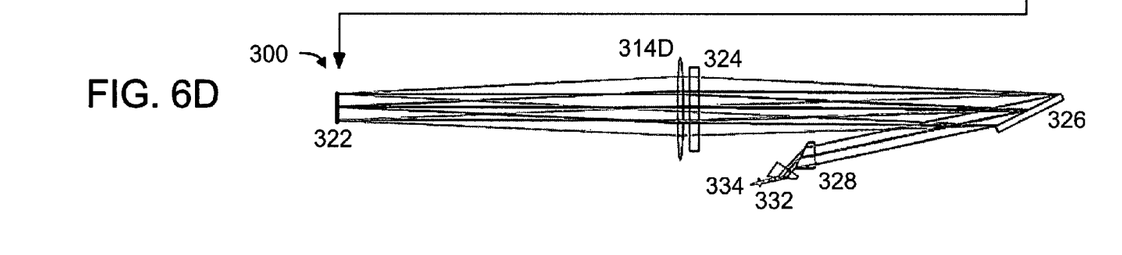
Figure 7:
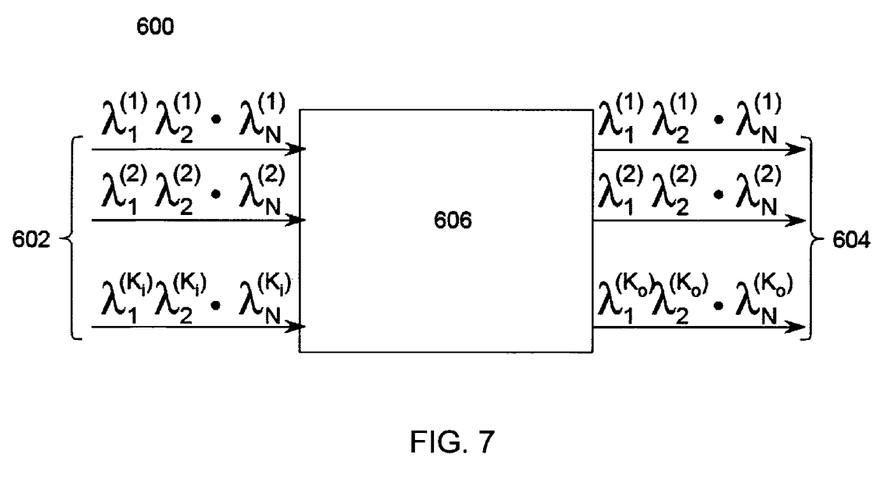
FIG. 7 is a schematic illustration of an optical communication system, according to some embodiments of the present invention.

Following is a more detailed description of the optical paths between input steering array 316 and output steering array 322, according to some embodiments of the present invention. Each of arrays 316 and 322 can independently be reflective or refractive. FIGS. 3A-F illustrate embodiments of the present invention in which both arrays 316 and 322 are reflective arrays, and FIG. 6 illustrate an embodiment of the present invention in which both arrays 316 and 322 are refractive arrays. The following description is for a non-limiting embodiment in which arrays 316 and 322 are reflective. A description of the optical paths between array 316 and array 322 in an embodiment in which these arrays are both refractive is provided hereinunder.

With specific reference to FIG. 3C, in some exemplary embodiments of the invention arrays 316 and 322 engage the back focal plane of lens system 314. In alternative embodiments, illustrated in FIGS. 3E and 3F, array 316 and array 322 engage focal planes of different lenses of system 314. Without loss of generality, the following description is for the embodiment in which system 314 includes one lens.

FIG. 3C illustrates input beams 364, corresponding to one of the input ports 302 (not shown in FIG. 3C, see FIG. 3B). For clarity of presentation, beams from other input ports (in preferred embodiments in which $K_i>1$) are not shown, but the ordinarily skilled person, provided with the details described herein would, know how to add more beams to FIG. 3C. Generally, as stated a given input port provides more than one optical channel. These channels that are separated along the x direction by the input optics as described above. Thus, beams 364 represent multiple optical channels that are separated along the x direction, hence not explicitly shown in FIG. 3C (see channels 350-1, 350-2 and 350-3 in FIGS. 3B and 2D).

After striking diffractive element 308, each of beams 364 traverse input tilter array 312, which applies to beams 364, as stated, a tilt which is specific to the respective input port. The tilt angle, however, is preferably the same to all channels of the respective input port. Thus, each of beams 364 is tilted with respect to the y direction by the same angle. Once tilted, beams 364 and pass through lens system 314 which focuses beams 364 onto input steering array 316 at its back focal plane (or the back focal plane of one of the lenses of system 314). The tilt applied by tilter array 312 prevents overlap at the lens back focal plane. Beams 364 thus collectively strike a single row of array 316, wherein each individual beam of beams 364 strikes one steering element within that row. In other words, the tilt applied by tilter array 312 ensure that each of beams 364 strikes the correct row of array 316, and the spatial dispersion applied by diffractive optical element 308 ensures that each of beams 364 strikes the correct column of array 316 (the rows and columns of array 316 are shown in FIG. 4).

The beam steering elements at the respective row of array 316 steer beams 364 by reflection toward lens system 314. The beams exiting array 316 are designated 366.

Notice that the steering angles prescribed by array 316 are not necessarily the same for all channels. In the representative example that is schematically illustrated in FIG. 3C, the row of array 316 which receives beams 364 prescribes four different steering angles with respect to the y axis, and therefore beams 366 are shown as four lines separated along the y direction.

Notice further that each of the four lines that represent beams 366 may, in principle, correspond to more than one beam since array 316 can prescribe the same steering angle to two different channels. However, since the channels are separated along the x direction, multiple channels for each of the lines the represent beams 366 are now shown. For example, consider a simple situation in which the number of channels, N, provided by a particular input port is 5. These 5 channels, denoted Ch1 through Ch5, are respectively focused on 5 different steering elements 322-1-1, ..., 322-1-5 arranged along a particular row of array 316. Suppose that these five steering elements prescribe four different steering angles, $\theta_1, \ldots \theta_4$, where $\theta_1$ is prescribed by both 322-1-1 and 322-1-2, $\theta_2$ is prescribed by 322-1-3, $\theta_3$ is prescribed by 322-1-4, and $\theta_4$ is prescribed by 322-1-5. In this situation, one of the four lines the represent beams 366 corresponds to channels Ch1 and Ch2 (separated along the x direction) while each of the other three lines correspond to one of the channels Ch3, Ch4 and Ch5.

Beams 366 pass through lens system 314, and are incident on a redirector array 318. The angles prescribed by the individual steering elements at the respective row of array 316 determine the position along the y axis of each of beams 366 at redirector array 318 and the choice of redirection angle of array 318. Array 318 serves for fulfilling space-variant imaging arrangements between 316 and 322. The number of space-variant imaging operation which can be applied by array 318 can be Ki+Ko−1.

Redirector array 318 preferably has multiple elongated redirector elements arranged in rows extending along the x direction and stacked along the y direction. Thus, beams 366 are incident on one or more of the elongated redirector elements of array 318 which are dynamically selected by the angles prescribed by array 316. In the representative example illustrated in FIG. 3C, array 316 selects (for the respective input port) four different elongated redirector elements of array 318. The redirector elements of array 318 are arranged such that each redirector element redirects a light beam at a slightly different angle. Redirector array 318 is preferably a static optical element, wherein each elongated redirector elements impart a unique and predetermined angle to the respective beam.

Redirector array 318 can be a reflector array, in which case each redirector element is a reflective element with a unique tile which reflects a light beam at a slightly different angle. This embodiment is illustrated in FIG. 3C. A representative example for a reflector array suitable for the present embodiments includes, without limitation, an array of micromirrors. Redirector array 318 can alternatively be a refractive array, in which case each redirector element is a refractive element which refracts a light beam at a slightly different angle. This embodiment is illustrated in FIGS. 6B and 6C. A representative example for a refractor array suitable for the present embodiments includes, without limitation, an array of microprisms.

Once redirected by the respective refractor elements of redirector array 318, beams 366 back propagate through lens system 314 onto steering array 322. Thus, the beam steering elements of array 316 are independently imaged by lens system 314 onto the beam steering elements of array 322.

The beam steering elements of array 322 (one per optical channel per output port, see FIG. 4) dynamically steer beams 366 upon reflection towards lens system 314 and output filter array 324. The steering angles prescribed by array 322 are in accordance with the desired input-output switching scheme.

The steering angle of a given mirror of array 322 preferably ensures that the beam steered by it arrives at the respective tilter element of tilter array 324 corresponding to output port. Beams 366 are now aligned along the y direction for efficient coupling to output ports 334. Combining along the x direction of several channels into one output port can be effected by output diffractive element 326, as further detailed hereinabove. Thus, the above description demonstrates switching to four distinct output ports.

Figure 5:
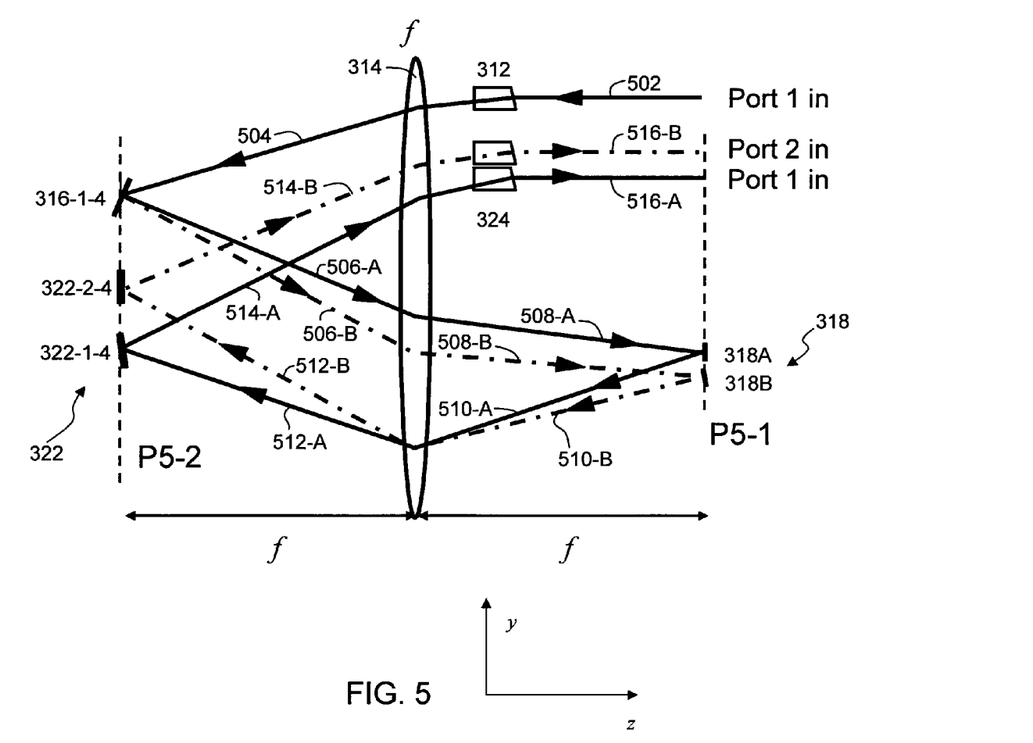
FIG. 5 is a schematic illustration showing imaging between two steering arrays for a particular beam from a particular input port according to some embodiments of the present invention.

The imaging between beam steering arrays 316 and 322 for a particular beam from a particular input port is better illustrated in FIG. 5, which is a partial side view of system 300. FIG. 5 considers a beam 502 from input port 1, and shows beam 502 after it has been diffracted (by input diffractive 308, not shown, see FIG. 3B) at the front focal plane P5-1 of lens system 314. Beam 502 is refracted by a respective element of tilter array 312, and after lens system 314 the beam, now designated 504, is focused at the back focal plane P5-2 of lens system 314 onto input steering array 316. In the representative example shown in FIG. 5, beam 504 incidents on steering element 316-1-4 of array 316. Thus, in this non-limiting example, beam 504 constitutes optical channel No. 4. Each steering element array 316 can, as stated, dynamically change the reflected beam direction. Beam 504 can be steered by element 316-1-4 into the direction 506-A (shown as a solid line) or the direction 506-B (shown as a dot-dash line).

Consider firstly a scenario in which the resulting steered beam is in the direction 506A. Steered beam 506A traverses lens 314, resulting in a beam 508A. Beam 508A propagates towards the front focal plane P5-1 of lens system 314 and impinges on redirector element (reflective or refractive) 318A of redirector array 318. Array 318 is preferably positioned at plane P5-1. Redirector element 318A is therefore selected by steering angle prescribed by element 316-1-4. The beam being redirected (reflected or refracted) by redirector element 318A, designated 510A is converted by lens system 314 to a beam 512A which is focused onto array 322 at focal plane P5-2. In the representative example shown in FIG. 5, focused beam 512A incidents on element 322-1-4 of array 322. Thus, in this scenario, element 316-1-4 is imaged onto element 322-1-4. Continuing with this scenario, element 322-1-4 steers the beam to produce a steered beam 514A propagating towards a respective tilter element of tilter array 324 which realign the beam resulting in a realign beam 516A. Beam 516A is realigned to allow its efficient coupling into output port 1. Thus, in this scenario, the fourth optical channel of the first input port is routed to the first output port.

Consider secondly a scenario in which the resulting steered beam is in the direction 506B. Steered beam 506B traverses lens 314, resulting in a beam 508B, which propagates towards the front focal plane P5-1 of lens system 314 and impinges on redirector element 318B of redirector array 318. Thus, in this scenario element 316-1-4 selects refractive element 318B. The beam being redirected by reflector element 318B, designated 510B, is converted by lens system 314 to a beam 512B which is focused onto element 322-2-4 of array 322. Thus, in this scenario, element 316-1-4 is imaged onto element 322-2-4. Element 322-2-4 steers the beam to produce a steered beam 514B propagating towards another tilter element of tilter array 324 which realign the beam resulting in a beam 516B, realigned to allow its efficient coupling into output port 2. Thus, in this scenario, the fourth optical channel of the first input port is routed to the second output port.

Note that because of the inversion property of the above described imaging process, the spatial dispersion along the x direction (not shown in FIG. 5) is flipped. In these embodiments, the aforementioned mutual flip relation between diffractive optical elements 308 and 326 maintains separation between input ports 302 and output ports 304.

Following is a description of the optical paths between array 316 and array 322 in an embodiment in which these arrays are both refractive. This embodiment is illustrated, in serial continuation, in FIGS. 6A-D.

FIGS. 6A, 6B, and 6D are schematic illustrations of a top view of system 300, whereas 6C is a side view of section 6B. The optical paths from input ports 302 to array 316 are shown in FIG. 6A, from array 316 to array 322 are shown in FIGS. 6B and 6C (the former from the top, the latter from the side), and from array 322 to output port 334 is shown in FIG. 6D. Thus, FIGS. 6B and 6C should be understood as a continuation of FIG. 6A, and FIG. 6D should be understood as a continuation of FIGS. 6B and 6C.

In the embodiment illustrated in FIGS. 6A-D, lens system 314 comprises four lens systems designated 314A, 314B, 314C and 314D. Referring to FIG. 6A, array 316 engages the back focal plane of lens system 314A. The input beams, after striking diffractive element 308, traverse input tilter array 312, which applies to the beams a tilt as further detailed hereinabove. Once tilted, the beams pass through lens system 314A which focuses them onto input steering array 316 at its back focal plane.

Referring to FIG. 6B, the beam steering elements at the respective row of array 316 steer the beams by refraction toward lens system 314B. The beams pass through lens system 314B, and are incident on redirector array 318. In the present embodiment, array 318 is a refractor array. The angles prescribed by the individual steering elements at the respective row of array 316 determine the elongated redirector elements on which the beams incident. Thus, the elongated redirector elements of array 318 are dynamically selected by the angles prescribed by array 316. Once redirected by the respective refractor elements, the beams propagate through lens system 314C onto steering array 322. Thus, the beam steering elements of array 316 are independently imaged onto the beam steering elements of array 322 by a lens system which includes multiple individual lens systems (314A, 314B and 314C in the present example).

Referring to FIG. 6D, the beam steering elements of array 322 (one per optical channel per output port) steer the beams by refraction towards lens system 314D and output tilter array 324. The steering angles prescribed by array 322 are in accordance with the desired input-output switching scheme. The steering angle of a given mirror of array 322 preferably ensures that the beam steered by it arrives at the respective tilter element of tilter array 324 corresponding to output port. The beams are now aligned for efficient coupling to output ports 334. Output diffractive element 326 combines several channels into one output port, as further detailed hereinabove.

While the embodiments above are described with a particular emphasis to a configuration in which arrays 316, 318 and 322 are all reflective, and a configuration in which arrays 316, 318 and 322 are all refractive, it is to be understood that more detailed reference to these configurations is not to be interpreted as limiting the scope of the invention in any way. Thus, any of arrays 316, 318 and 322 can independently be reflective or refractive, and some embodiments of the present invention contemplate combination of refractive and reflective arrays.

It is expected that during the life of a patent maturing from this application many relevant optical steering elements will be developed and the scope of the term beam steering element is intended to include all such new technologies a priori.

FIG. 6 is a schematic partial illustration of an optical communication system 600, according to some embodiments of the present invention. Shown in FIG. 6 is the switching node part of system 600. System 600 comprises at least one, more preferably a plurality of input waveguides 602, for propagating incoming wavelength division multiplexed light; at least one, more preferably a plurality of output waveguides 604, for propagating outgoing wavelength division multiplexed light; and a WSXC system 606. In various exemplary embodiments of the invention system 606 comprises system 300 described above. In some embodiments of the present invention system 606 is system 300. WSXC system 606 can be connected to waveguides 602 and 604 by means of output and input ports such as ports 304 and 334 described above. Waveguides 602 and 604 can be of any type which is suitable for guiding wavelength division multiplexed light. For example, waveguides 602 and 604 can be optical fibers or they can be embedded waveguides, such as waveguides of Planar Light Circuits (PLC) or other arrays. WSXC system 606 perform optical switching to allow wavelength division multiplexed optical data arriving from $K_i$ input waveguides routed to $K_o$ output waveguides. The wavelength division multiplexed optical data are denoted in FIG. 7 by $\lambda^{(p)}_q$, where p is an input waveguide index (p=1, 2, ..., $K_i$), and q is a channel index (q=1, 2, ..., N). WSXC system 606 is capable of routing any channel $\lambda^{(p)}_q$ from any input waveguide to any output waveguide, as further detailed hereinabove.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An optical switching system, comprising:
   input optics, for receiving light from at least one input optical port and separating said light into a plurality of optical channels to assign a separate optical path to each channel of each input optical port;
   output optics, for combining optical paths into at least one output optical port; and
   an optical path steering arrangement for dynamically steering any optical path into any optical output port, said optical path steering arrangement having an input steering array and an output steering array arranged such that the input steering array is imaged onto said output steering array, wherein said input steering array is configured to receive light via said optical paths and steer each optical channel to an individual element of said output steering array,
   wherein said input optics comprises an input diffractive optical element for separating said light according to wavelength, and an input optical tilter array for separating said light according to said at least one input optical port.

2. The system according to claim 1, wherein said at least one input optical port comprises a plurality of input optical ports.

3. The system according to claim 1, wherein said at least one output optical port comprises a plurality of output optical ports.

4. The system according to claim 1, wherein said input steering array and said output steering array engage the same plane.

5. The system according to claim 1, wherein said optical path steering arrangement comprises a redirector array configured for providing spatial shifts subsequently to said steering by said input steering array.

6. The system according to claim 5, wherein said redirector array comprises a plurality of redirector elements, each configured for redirecting a light beam impinging thereon by a predetermined redirection angle which is different from any redirection angle corresponding to any other redirector element of said redirector array.

7. The system according to claim 5, wherein said redirector array is a reflective redirector array.

8. The system according to claim 5, wherein said redirector array is a refractive redirector array.

9. The system according to claim 1, wherein said output optics comprises an output optical tilter array for tilting said steered light so as to align light beams according to said at least one output optical port, and an output diffractive optical element for coupling optical channels according to said alignment.

10. The system according to claim 1, wherein said input optics comprise an anamorphic prism optics constituted for expanding said input light along a first direction.

11. The system according to claim 10, wherein said output optics comprise an anamorphic prism optics for contacting said coupled optical channel along said first direction.

12. The system according to claim 1, further comprising a controller configured for controlling said input steering array according to a predetermined imaging scenario between said input steering array and output steering array.

13. The system according to claim 12, wherein said controller is configured for detuning at least one of said input steering array and said output steering array.

14. An optical communication system, comprising at least one input waveguide, for propagating incoming wavelength division multiplexed light, at least one output waveguide for propagating outgoing wavelength division multiplexed light and a wavelength-selective cross-connect (WSXC) system, wherein said WSXC system comprises the system according to claim 1.

15. A method of optical switching, comprising:
directing light constituting a plurality of optical channels into at least one input optical port of the system according to claim 12;
operating said controller according to said predetermined imaging scenario; and
receiving light from said at least one output optical port.

16. A method of optical switching, comprising:
receiving light constituting N optical channels in each of K input optical ports;
separating said light according to said optical channels along a first direction using an input diffractive optical element, and separating said light according to said input optical ports along a second direction using an input optical tilter array;
focusing said separated light onto a plurality of focal spots defining a first array;
imaging each focal spot onto an image focal spot to define a second array, wherein an order along said second direction is different among said second array and said first array; and
steering light beams away from said second array to couple said beams into K output optical ports, wherein all beams corresponding to image focal spots having the same location along said second direction are coupled to the same output optical port.

17. The method according to claim 16, wherein said first array and said second array engage the same plane.

18. The method according to claim 16, wherein said separating according to said optical channels is effected by diffraction, and said separating according to said input optical port is effected by refraction.

19. The method according to claim 16, wherein said beams are coupled by tilting each beam along said second direction according to a respective output optical port, and diffracting said tilted beams along said first direction.

20. The method according to claim 16, further comprising, prior to said separation, expanding said received light along said first direction.

21. The method according to claim 16, wherein said coupling comprises contracting said beams along said first direction.

22. The method according to claim 16, further comprising employing at least one detuning procedure for equalizing power levels of all channels for a given output optical port.

* * * * *